Oct. 7, 1924.

C. BORNMANN, JR 1,511,157

CAMERA BACK

Filed Jan. 30, 1923

INVENTOR
CARL BORNMANN JR.
BY
Philip S. Hopkins
ATTORNEY

Oct. 7, 1924.

C. BORNMANN, JR 1,511,157

CAMERA BACK

Filed Jan. 30, 1923

INVENTOR
CARL BORNMANN JR.
BY
Philip S. Hopkins
ATTORNEY

Patented Oct. 7, 1924.

1,511,157

UNITED STATES PATENT OFFICE.

CARL BORNMANN, JR., OF BINGHAMTON, NEW YORK, ASSIGNOR, BY MESNE ASSIGNMENTS, TO ANSCO PHOTOPRODUCTS, INC., OF NEW YORK, N. Y., A CORPORATION OF NEW YORK.

CAMERA BACK.

Application filed January 30, 1923. Serial No. 615,972.

*To all whom it may concern:*

Be it known that I, CARL BORNMANN, Jr., a citizen of the United States, and a resident of the city of Binghamton, county of Broome, and State of New York, have invented certain new and useful Improvements in a Camera Back, of which the following is a description, reference being had to the accompanying drawing, which forms a part of this application.

This invention is directed to an improvement in cameras, and more particularly to a back for cameras of the folding type, although the same is equally applicable to box cameras as well.

As is well known, the camera backs now in use are provided with a small peep-hole or window comprising a circular aperture cut in the back and covered with colored celluloid through which are viewed the indicating numbers usually located on the protective paper covering with which sensitized photographic films are provided. It frequently happens, due to the smallness of the peep-hole that the operator of the camera in winding the film from one exposure to the next, will carelessly or accidentally wind the film too far bringing the desired indicating number beyond the peep-hole and thereby destroying the usefulness of the same and the indicating numbers.

Also in cameras of the automatic or self winding type the indicating numbers on the film covering are seldom positioned so that they may be observed thru the peep-hole. This is particularly true in the case of an automatic film winding camera which is not provided with a compensating means to care for the varying diameter of the film spools as the film is wound from one to the other. In such a camera the indicating numbers are positioned with each winding of the film at regularly advanced intervals so that although "Figure 1" appears at the peep-hole the following figures will be carried past the peep-hole, each succeeding figure being further spaced therefrom.

Furthermore even though such an automatic film winding camera is provided with a compensating means to take care of the varying diameter of the spools, such compensating means cannot function precisely the same with every roll of film which is used in the camera. This is due to the fact that the film itself, the paper covering therefor and the diameter of the spools are not all of a uniform size. If therefore, the film or paper covering of one roll varies even a thousandth of an inch in thickness or if the diameter of the two spools varies a thousandth or more the compensator, no matter how accurate the same may be mechanically, cannot take care of this variation in such a manner so as to bring the indicating numbers beneath the ordinary peep-hole at each winding of the film.

To overcome these difficulties I have devised a new and improved camera back provided with a peep-hole or window design to take care both of accidental winding too far on hand wound cameras, and to provide for the visibility of the indicating numbers at all times on the automatic film winding cameras whether provided with a compensating means or not.

More specifically my improved camera back is provided with an elongated opening running longitudinally of the camera and so positioned on the back as to be directly above the indicating numbers on the film covering. This elongated peep-hole is covered with suitable colored glass or celluloid, preferably non-actinic celluloid, to make the same light tight and at the same time allow for the perfect visibility of the indicating numbers.

It is the principal object of this invention therefore to overcome the difficulties enumerated above and to provide a camera back with a peep-hole or window which affords under all circumstances a vision of the indicating numbers on the film covering whereby the operator of the camera may at all times be aware of the exact position of his film with relation to each exposure.

The second object of this invention is to provide such a peep hole with an indicating means whereby any difficulty which might be encountered in winding the film to the starting position may be overcome.

A third object is to so position the peep-hole in the camera back as to make the same as near light tight as is possible.

A still further object is to provide the peep-hole with an extra safeguard against light in the form of a cover therefor.

Other objects and advantages in details of construction and operation will be apparent as the description proceeds, reference being had to the accompanying drawings wherein like reference numerals indicate like parts.

Figures 1, 2:
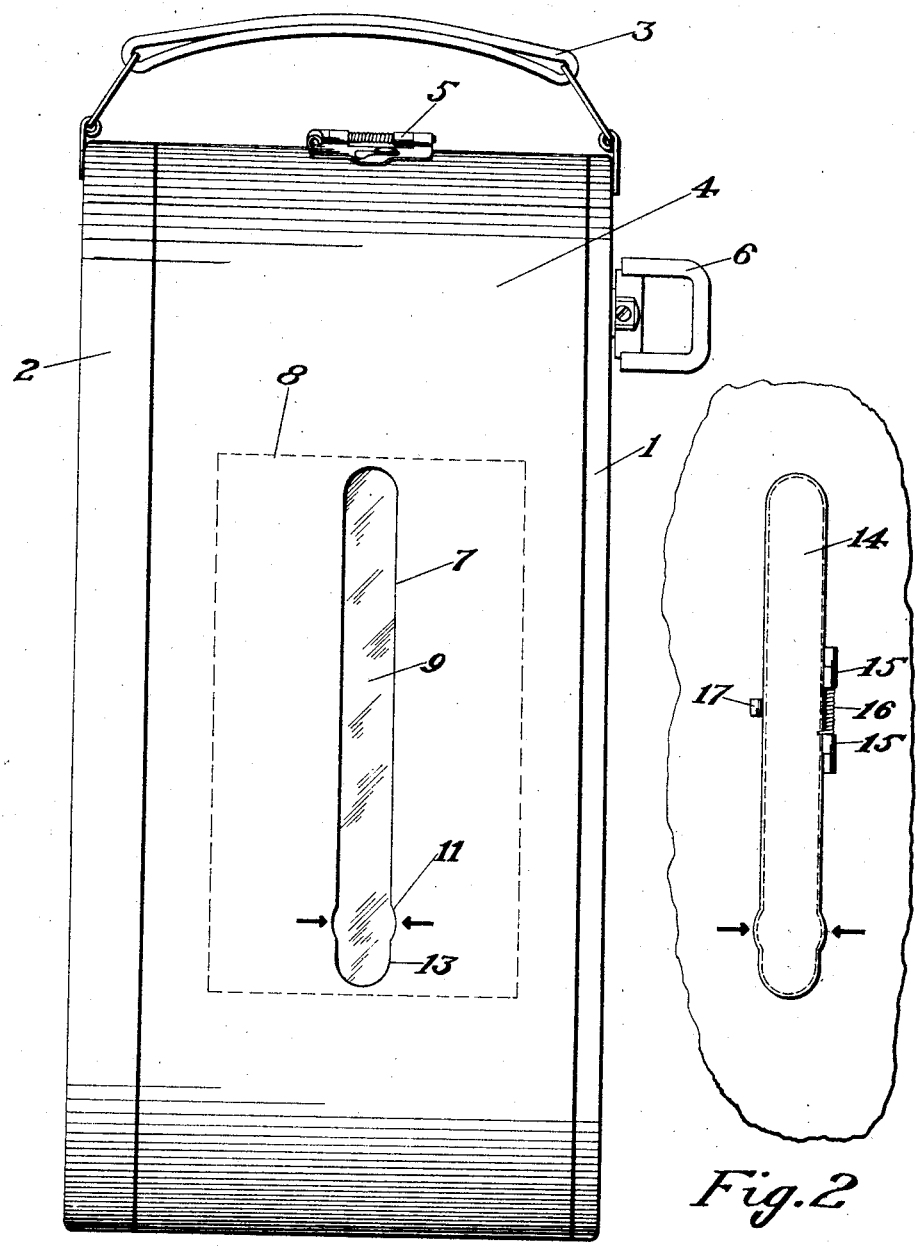
Figure 1 illustrates the preferred form of my invention, showing the peep-hole or window positioned centrally of the camera back and lying entirely within the focal plane of the camera.
Figure 2 shows in a modified form my invention with a cover therefor.

The reference numeral 1 refers generally to a folding camera, and the type shown is that of an automatic film winding camera provided with the additional side piece 2 which houses the automatic winding mechanism (not shown) and which forms no part of this invention. The carrying handle of the camera is indicated at 3, and my improved back is designated generally by 4. The back 4 is provided with the usual fastening or securing means 5 which permits the removal of said back from the camera for the purpose of loading the film therein. The winding key 6 is provided in this type of camera for the purpose of placing the spring motor, which drives the automatic winding mechanism, under tension. The parts just described are of the usual conventional construction in this type of camera and require no further detailed description.

Figures 3, 4:
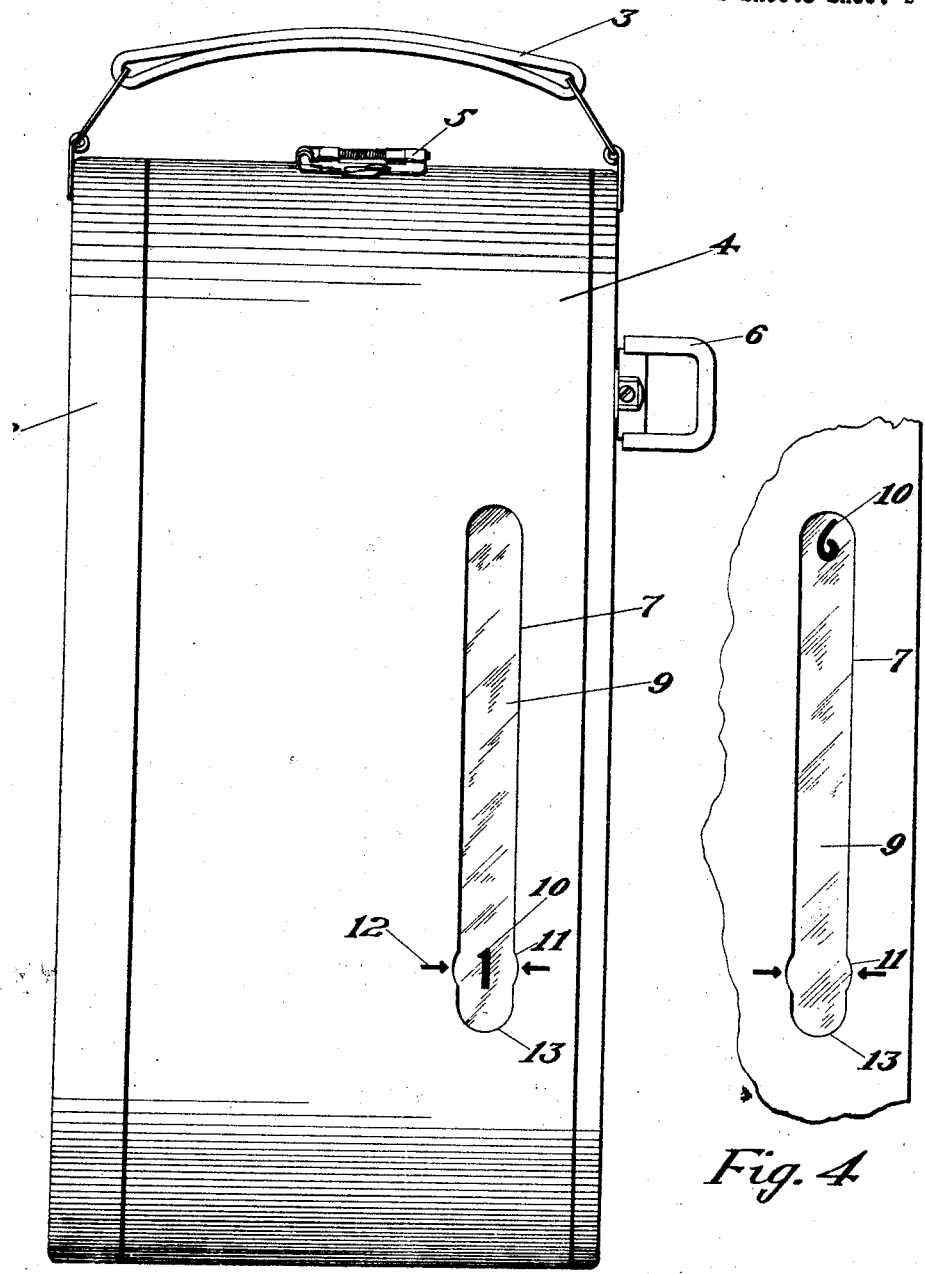
Figure 3 is similar to Figure 1 but showing the peep-hole positioned at one side of the camera back.
Figure 4 is a detail showing the relative position of the indicating number "6" on the film covering when the film is being wound thru an automatic film winding camera not provided with a compensator.

My improved peep-hole or window is designated at 7 and as shown is cut from the back 4 preferably centrally thereof, but if desired may be placed in any convenient position on the back, for instance as shown in Figure 3. The principal advantage in placing the window 7 in the center of the back 4 lies in the fact that when so positioned the same is located further away from the edges of the film which sometimes protrudes slightly beyond the edges of the paper covering therefor. It will readily be understood therefore that if the peep-hole were positioned near the edges of the film any light which might leak thru said peep-hole would more easily reach the film than is the case when the peep-hole is positioned in the center of the back as shown in Figure 1.

It will also be noted by reference to Figure 1 that the peep-hole or window is positioned entirely within the focal plane of the camera, indicated in dotted lines 8. This is to prevent any light which might leak thru the window 7, from entering the spool chambers of the camera which lie at either end of the focal plane, and be reflected back therefrom against the edges of the film, as would be the case if the peep-hole projected beyond the focal plane and over such spool chambers. It is well known that camera backs of this character are provided on the under side with light tension springs (not shown) which tend to hold the film and its paper covering perfectly flat over the focal plane. It will therefore be seen that with the peep-hole positioned in the center of the back and lying entirely within the focal plane of the camera there is no possibility of any light reaching the film thru the peep-hole.

The peep-hole or window 7 is covered with any suitable transparent material 9, such as celluloid, thru which the indicating numbers 10 are visible. As a further source of safety against light it is preferred to cover this peep-hole with non-actinic celluloid which effectually prevents actinic rays of light from entering the camera thru said peep-hole at all.

At the lower end of the longitudinal window 7, there is provided an enlarged circular portion 11. An indicator 12 of the character shown, is positioned adjacent said enlarged portion for the purpose of guiding the operator of the camera in winding his film to the starting point, or in other words, bringing "Figure 1" to the proper position before making an exposure. It will be noted that the window or peep-hole 7 is extended slightly beyond the enlarged portion 11. The purpose of this extended portion 13 is two-fold; first, it provides a safeguard for the operator in winding his film to the starting point in that when "Figure 1" first appears in such extended portion 13 it gives him time to retard or slow up his winding before the "Figure 1" reaches the starting point 11, and thus prevent accidental winding too far. Secondly when the automatic film winding means is used to wind the film from one exposure to another the indicating number "2" usually appears slightly behind the enlarged portion 11 which is the position of the indicating number "1", in starting. This is due to the fact that on films as now constructed there is provided for a space of about three eighths of an inch between each exposure, and inasmuch as the film winding mechanism utilizes only about half of this space between the first and second exposures the result is that when the film is wound automatically the indicating number "2" does not come quite to the position where "Figure 1" was located.

Figure 2 shows a modified form of my invention which provides still another safeguard against the leakage of light thru the peep-hole, in the form of a hinged cover 14. This cover may be stamped from sheet metal or other suitable material and made to conform in dimension and shape to the peep-hole. As shown the cover 14 is provided with hinges 15 at one side thereof and a coil spring 16 which normally exerts its energy to hold the cover 14 in closed position over the peep-hole. A finger piece 17 is provided by means of which the cover may be raised at any time to permit the operator to see what indicating number is visible thru the peep-hole and thus determine the number of exposure made.

It will thus be seen that I have provided in my improved camera back a peep-hole or window which may be used with equal advantage on either the odinary hand wound cameras or on the automatic film winding type of cameras and which overcomes the objection to the small circular peep-hole now in universal use, in that the indicating numbers on the film covering are visible at all times regardless of their longitudinal position with relation to the focal plane of the exposure chamber of the camera. If in the hand wound cameras the operator accidentally winds an indicating number further than it should be, the same is still visible and an exposure is not lost because of such accidental winding. Also in the automatically winding cameras in which the indicating numbers vary considerably in their positions, my improved window provides for their visibility at all times.

I claim:

1. In combination with a camera, a back therefor, said back being provided with an elongated window, said window having an enlarged circular cut-out portion intermediate the ends thereof.

2. In combination with a camera, a back therefor, said back being provided with an elongated window having an enlarged cut out portion intermediate the ends thereof, and said back having indicating marks adjacent the enlarged portion of said window.

3. In combination with a camera back provided with an elongated peep-hole having an enlarged portion intermediate the ends thereof, of indicating means adjacent said enlarged portion.

CARL BORNMANN, Jr.